(12) United States Patent
Liu et al.

(10) Patent No.: US 8,032,583 B2
(45) Date of Patent: Oct. 4, 2011

(54) APPARATUS AND METHOD FOR PROVIDING PEER-TO-PEER PROXY SERVICES IN PEER-TO-PEER COMMUNICATIONS

(75) Inventors: Pin-Chuan Liu, Hsinchu (TW); Chon-Jei Lee, Kaohsiung County (TW); Ta-Yang Juan, Changhua County (TW); Ming-Fu Sun, Taipei County (TW)

(73) Assignee: Industrial Technology Research Institute, Hsinchu (TW)

( * ) Notice: Subject to any disclaimer, the term of this patent is extended or adjusted under 35 U.S.C. 154(b) by 165 days.

(21) Appl. No.: 12/436,023

(22) Filed: May 5, 2009

(65) Prior Publication Data
US 2010/0169964 A1 Jul. 1, 2010

(30) Foreign Application Priority Data
Dec. 31, 2008 (TW) ................................ 97151752 A

(51) Int. Cl.
G06G 15/16 (2006.01)

(52) U.S. Cl. ........ 709/201; 709/206; 709/231; 709/249; 709/223; 709/245; 709/232; 709/227; 709/226; 370/401; 726/12

(58) Field of Classification Search .................. 709/206, 709/231, 249, 223, 201, 245, 232, 227, 226; 370/401; 726/12
See application file for complete search history.

(56) References Cited

U.S. PATENT DOCUMENTS

| 7,043,644 | B2 * | 5/2006 | DeBruine ....................... 713/153 |
| 2006/0168304 | A1 | 7/2006 | Bauer et al. |
| 2006/0168318 | A1 | 7/2006 | Twiss |
| 2007/0070996 | A1 | 3/2007 | Oran |
| 2007/0195807 | A1 * | 8/2007 | Collins et al. ................. 370/401 |
| 2008/0133758 | A1 | 6/2008 | Lee et al. |
| 2008/0235391 | A1 * | 9/2008 | Painter et al. ................ 709/232 |

\* cited by examiner

*Primary Examiner* — Wing Chan
*Assistant Examiner* — Hitesh Patel

(57) ABSTRACT

A network gateway device providing peer-to-peer proxy service is provided, including a P2P meta descriptor detector detecting an original P2P meta descriptor file from the public network, a P2P proxy control unit modifying the original P2P meta descriptor file to generate a modified P2P meta descriptor file, and forwarding the modified P2P meta descriptor file to a computer in the private network, an internal tracker receiving a first inquiry message, and replying with a pseudo sharing computer list, and a peer-to-peer engine loading the original P2P meta descriptor file to download shared contents, and forwarding the shared contents to the computer.

19 Claims, 5 Drawing Sheets

APPARATUS AND METHOD FOR PROVIDING PEER-TO-PEER PROXY SERVICES IN PEER-TO-PEER COMMUNICATIONS

CROSS REFERENCE TO RELATED APPLICATIONS

This Application claims priority of Taiwan Patent Application No. 97151752, filed on Dec. 31, 2008, the entirety of which is incorporated by reference herein.

BACKGROUND OF THE INVENTION

1. Field of the Invention

The invention generally relates to peer-to-peer communications and, more particularly, to an apparatus and method for providing peer-to-peer proxy services in peer-to-peer communications.

2. Description of the Related Art

In recent years, peer-to-peer applications, such as BitTorrent and eMule, have become increasingly popular. Users from around the world can conveniently download and share all kinds of files. In a conventional downloading scenario, there is only one uploading user for several other users to download a shared file. Thus, the upstream bandwidth of the uploading user can easily become bottlenecked when the number of downloading users increases. Additionally, when bottlenecks occur, the system resources and the network bandwidth of the uploading user may become insufficient. On the other hand, in a peer-to-peer application, take BitTorrent as an example, every downloading user is also uploading the shared file so that the uploading task may be distributed to every user. In this case, every user can benefit from increasing connection sources when there are more users sharing the same shared file.

In spite of the above mentioned benefits, the number of connections established by peer-to-peer applications is far more than that by other applications. This results in a huge burden on network gateway devices, especially the broadband gateway devices for households and small/medium sized enterprises. In a private network, each computer connected to a network gateway is assigned a private network address. When a computer in the private network tries to establish a connection to the public network, the network gateway performs the network address translation (NAT) procedure to replace the private network address with the public network address of the network gateway. During the NAT procedure, the network gateway creates a NAT table for storing the mapping information of every incoming and outgoing connection, including a source IP, a source port number, a destination IP, a destination port number, a mangled IP, a mangled port number, etc. FIG. 1 is a block diagram illustrating the NAT table of a network gateway. As shown in FIG. 1, the source and destination of every incoming and outgoing connection needs to be identified by the NAT procedure (by looking up the NAT table). As the number of connections increases, the NAT procedure occupies more and more system resources of the network gateway. This will cause the efficiency of the network gateway to drop significantly.

FIG. 2 is a block diagram illustrating BitTorrent communications through a network gateway device. In FIG. 2, a computer 221 in a private network 220 first downloads a torrent file 201 from a public network 210. The network address of a public tracker 212 and the information of the shared contents are included in the torrent file 201. The computer 221 sends an inquiry message to the public tracker 212 to ask for the list of computers that are sharing the shared contents. In the feedback of the public tracker 212, the computer 221 recognizes that a computer 211 is sharing the shared contents. The computer 221 further establishes a connection with the computer 211 to download the shared contents. The information of the connection is maintained, by the network gateway device 230, in a NAT table 231.

BRIEF SUMMARY OF THE INVENTION

In one embodiment of the invention, a network gateway device connected between a private network and a public network is provided. The network gateway device comprises a peer-to-peer meta descriptor detector, a peer-to-peer proxy control unit, an internal tracker, and a peer-to-peer engine. The peer-to-peer meta descriptor detector detects an original peer-to-peer meta descriptor file which is being downloaded from the public network. The peer-to-peer proxy control unit intercepts and receives the original peer-to-peer meta descriptor file from the peer-to-peer meta descriptor detector, modifies the original peer-to-peer meta descriptor file by replacing a network address of a tracker with a private network address of the internal tracker to generate a modified peer-to-peer meta descriptor file, and forwards the modified peer-to-peer meta descriptor file to a first computer in the private network. The internal tracker receives a first inquiry message from the first computer and replies to the first computer with a pseudo sharing computer list. The peer-to-peer engine loads the original peer-to-peer meta descriptor file, receives a first request message from the first computer for downloading shared contents, downloads the shared contents according to the original peer-to-peer meta descriptor file, and forwards the shared contents to the first computer.

In another embodiment of the invention, a network gateway device connected between a private network and a public network is provided. The network gateway device comprises a peer-to-peer meta descriptor detector, a peer-to-peer proxy control unit, an internal tracker, and a peer-to-peer engine. The peer-to-peer meta descriptor detector detects an original peer-to-peer meta descriptor file from the public network. The peer-to-peer proxy control unit receives the original peer-to-peer meta descriptor file from the peer-to-peer meta descriptor detector, modifies the original peer-to-peer meta descriptor file by replacing a network address of a tracker with a private network address of the internal tracker to generate a modified peer-to-peer meta descriptor file, and forwards the modified peer-to-peer meta descriptor file to a first computer in the private network. The internal tracker receives a first inquiry message from the first computer and replies to the first computer with a pseudo sharing computer list so that the first computer downloads shared contents from a second computer. The peer-to-peer engine loads the original peer-to-peer meta descriptor file.

In another embodiment of the invention, a peer-to-peer communication method for providing peer-to-peer proxy service in a network gateway device connected between a private network and a public network is provided. The peer-to-peer communication method comprises detecting an original peer-to-peer meta descriptor file from the public network, loading the original peer-to-peer meta descriptor file in a peer-to-peer engine, modifying the original peer-to-peer meta descriptor file by replacing a network address of a tracker with a private network address of the internal tracker to generate a modified peer-to-peer meta descriptor file, forwarding the modified peer-to-peer meta descriptor file to a first computer in the private network, receiving a first inquiry message from the first computer, determining whether a second computer is sharing shared contents in the private network according to a pseudo sharing computer list, replying to the first computer with the pseudo sharing computer list, receiving a first request message from the first computer for downloading the shared contents, downloading the shared contents according to the original peer-to-peer meta descriptor file, and forwarding the shared contents to the first computer.

Other aspects and features of the present invention will become apparent to those ordinarily skilled in the art upon review of the following description of specific embodiments of an apparatus and method for providing peer-to-peer proxy service in peer-to-peer communications.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
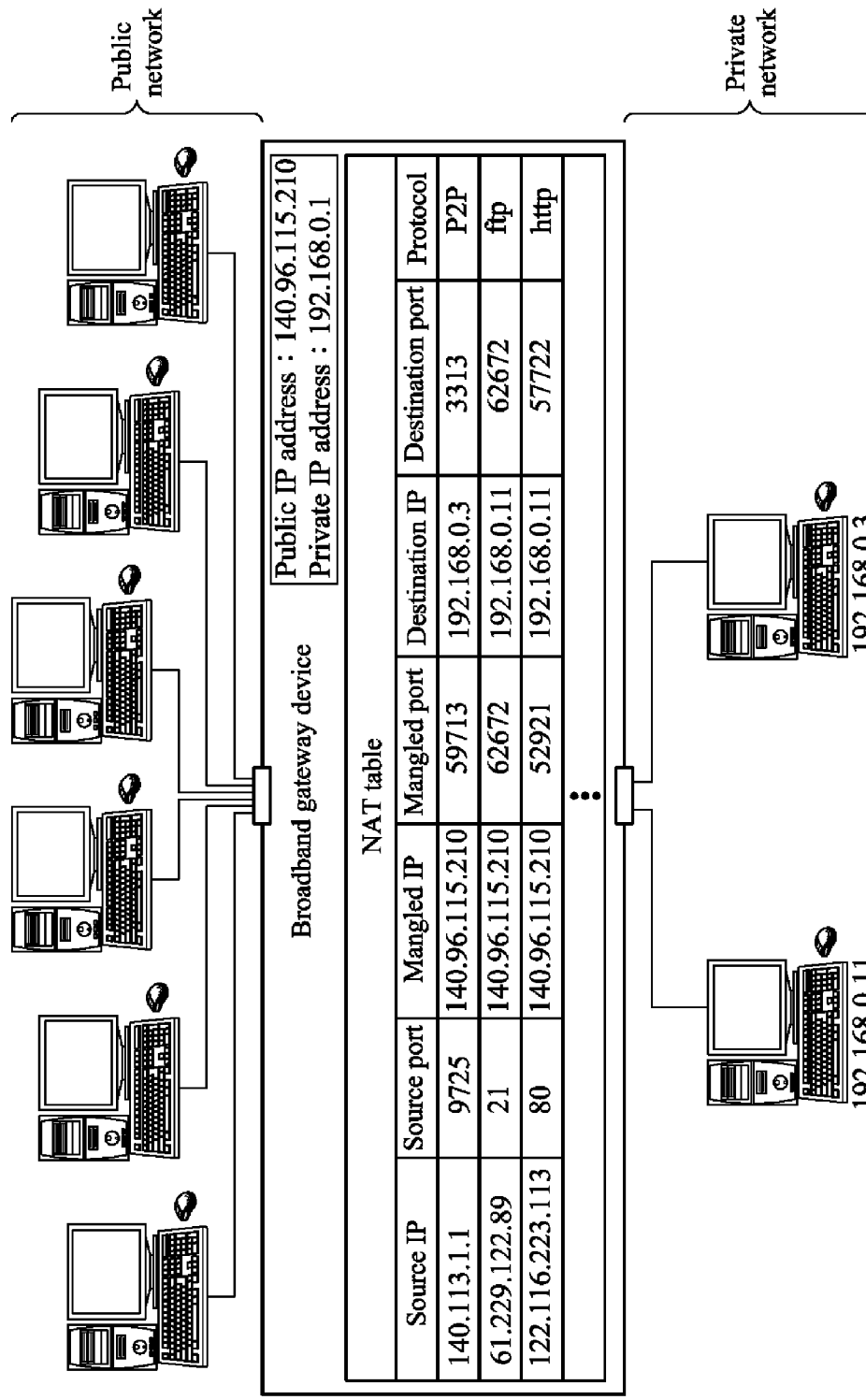
FIG. 1 is a block diagram illustrating the NAT table of a network gateway.
Figure 2:
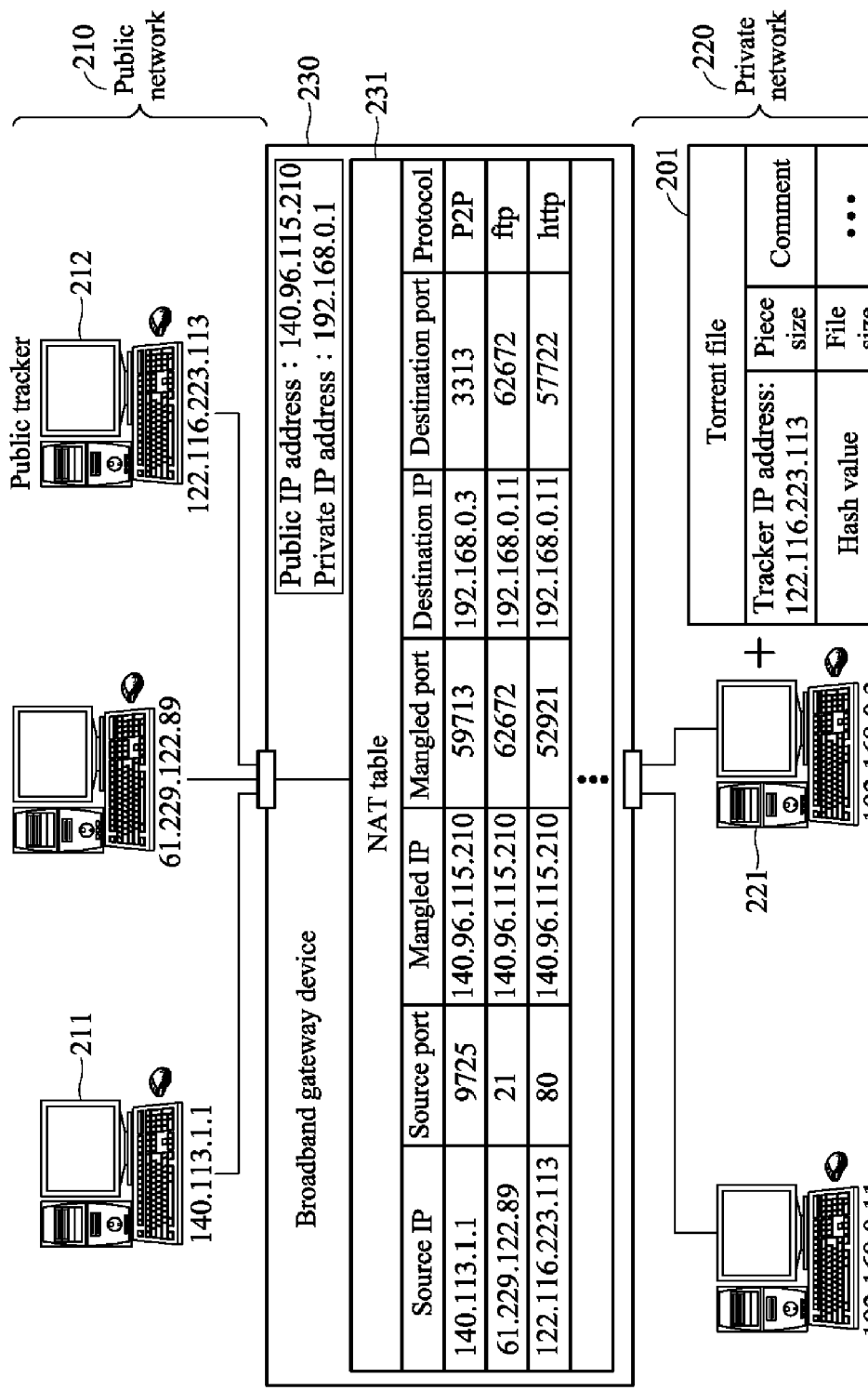
FIG. 2 is a block diagram illustrating BitTorrent communications through a network gateway device.
Figure 3:
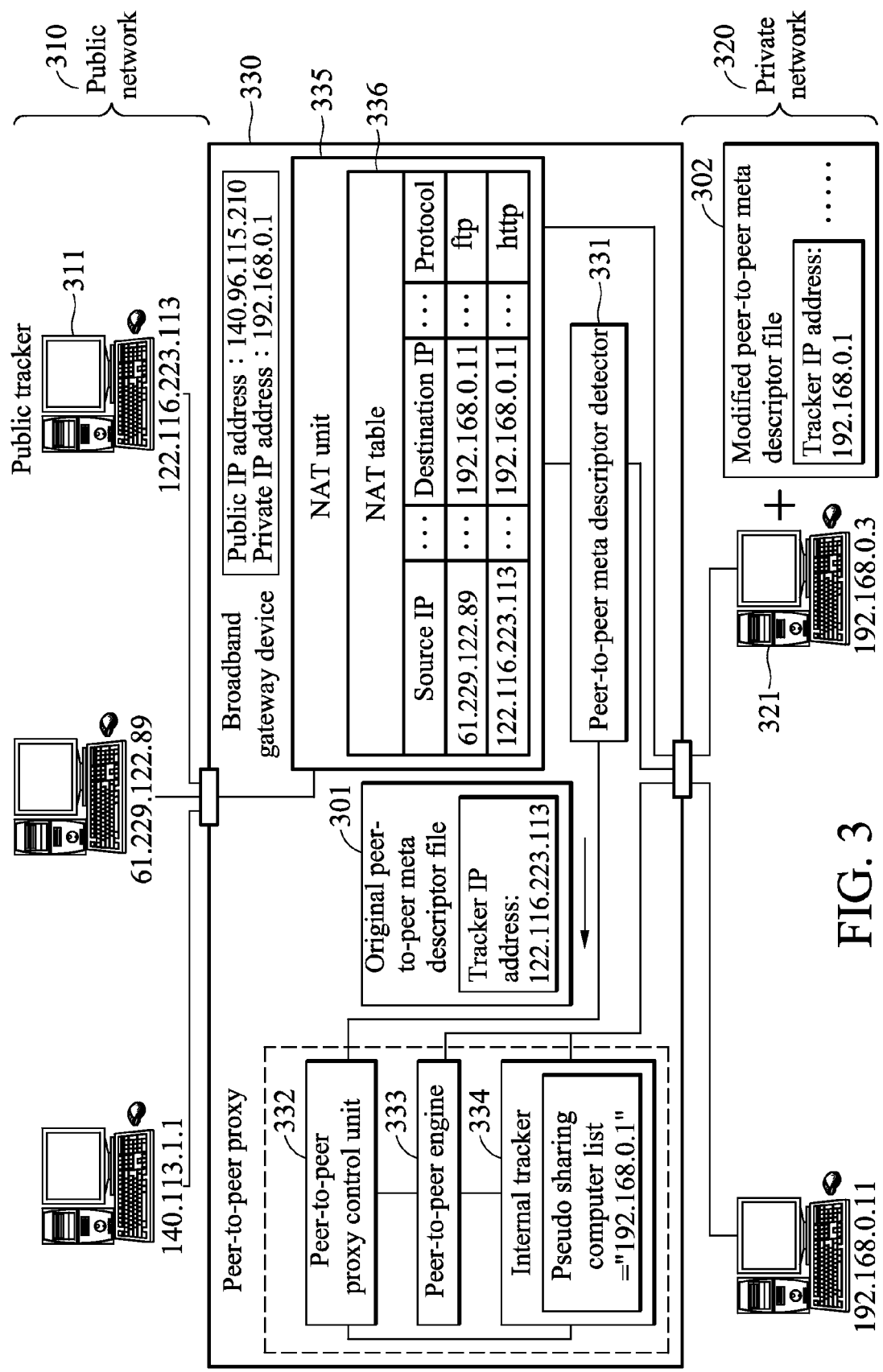
FIG. 3 is a block diagram illustrating a peer-to-peer proxy service provided in a network gateway device according to an embodiment of the invention.

FIG. 3 is a block diagram illustrating a peer-to-peer proxy service provided in a network gateway device according to an embodiment of the invention. In this embodiment, a network gateway device 330 is connected between a public network 310 and a private network 320, and has a public network address (IP address) 140.96.115.210 and a private network address 192.168.0.1. Unlike other network gateway devices, the network gateway device 330 of the invention uses a peer-to-peer proxy service to handle all peer-to-peer connections. The network gateway device 330 includes a peer-to-peer meta descriptor detector 331, a peer-to-peer proxy control unit 332, an internal tracker 334, a peer-to-peer engine 333, and a NAT unit 335. With the peer-to-peer proxy service of the invention, the number of connections stored in the NAT table 336 of the network gateway device 330 is far less than the NAT table shown in FIG. 2.

As shown in FIG. 3, before the computer 321 in the private network 320 initiates a peer-to-peer communication, it first tries to download an original peer-to-peer meta descriptor file 301 from the public network 310. The original peer-to-peer meta descriptor file 301 includes the information of the shared contents, and the network address and port number of the public tracker 311. As the peer-to-peer meta descriptor detector 331 monitors every packet datagram passing through the network gateway device 330, the peer-to-peer meta descriptor detector 331 intercepts the original peer-to-peer meta descriptor file 301 and forwards it to the peer-to-peer proxy control unit 332. When the peer-to-peer proxy control unit 332 receives the original peer-to-peer meta descriptor file 301, it forwards the original peer-to-peer meta descriptor file 301 to the peer-to-peer engine 333 and modifies the original peer-to-peer meta descriptor file 301 by replacing the network address and port number of the tracker with the private network address of the internal tracker 334 of network gateway device 330 (for example, 192.168.0.1:9786) to generate a modified peer-to-peer meta descriptor file 302. The peer-to-peer proxy control unit 332 further forwards the modified peer-to-peer meta descriptor file 302 to the computer 321 and the peer-to-peer engine 333. Meanwhile, the peer-to-peer engine 333 loads the modified peer-to-peer meta descriptor file 302 and inquiries with the internal tracker 334 to see if any computer is sharing the shared contents. As there is no computer in the private network 320 sharing the shared contents, the pseudo sharing computer list in the internal tracker 334 is empty. When the peer-to-peer engine 333 gets the empty pseudo sharing computer list from the internal tracker 334, it sends the internal tracker 334 the information indicting that it is sharing the shared contents and loads the original peer-to-peer meta descriptor file 301 instead. The internal tracker 334 accordingly adds the network address, 192.168.0.1, and port number (not shown in FIG. 3) of the peer-to-peer engine 333 to the pseudo sharing computer list.

When the computer 321 receives the modified peer-to-peer meta descriptor file 302, it sends, according to the network address of the tracker indicated in the modified peer-to-peer meta descriptor file 302, a first inquiry message to the internal tracker 334 to ask for a list of information of the computers that are sharing the shared contents at that moment. The internal tracker 334 replies to the computer 321 with the pseudo sharing computer list. Because the peer-to-peer engine 333 appears in the pseudo sharing computer list, the computer 321 sends a first request message to the peer-to-peer engine 333 for downloading the shared contents. Next, when the peer-to-peer engine 333 receives the first request message, it sends, according to the network address of the tracker indicated in the original peer-to-peer meta descriptor file 301, an external inquiry message to the public tracker 311 in the public network 310 to ask for a list of computers that are sharing the shared contents. The public tracker 311 replies to the peer-to-peer engine 333 with an authentic sharing computer list. Accordingly, the peer-to-peer engine 333 starts downloading the shared contents and subsequently forwards the shared contents to the computer 321.

Note that the computer 321 periodically inquiries with the internal tracker 334 to keep the list of sharing computers (in this case, the list is the pseudo sharing computer list) up-to-date so that it knows when the computers from the list stops sharing the shared contents. Further note that when the computer 321 finishes downloading the shared contents, it means that the computer 321 is ready to be a sharing computer. In this case, the internal tracker 334 adds the network address (192.168.0.3) and port number (not shown in FIG. 3) of the computer 321 to the pseudo sharing computer list, as soon as it is notified by the computer 321.

The NAT unit 335 performs the NAT procedure on every packet datagram passing through the network gateway device 330, except for the external inquiry message and the shared contents. That is to say, the packet datagram of the peer-to-peer communication doesn't need to be handled by the NAT unit 335 and thus burden on system resources spent during the NAT procedure is decreased.

In other embodiments, the network gateway device 330 may have multiple private network addresses. Thus, the internal tracker 334 and the peer-to-peer engine 333 can be assigned with different network address.

Figure 4:
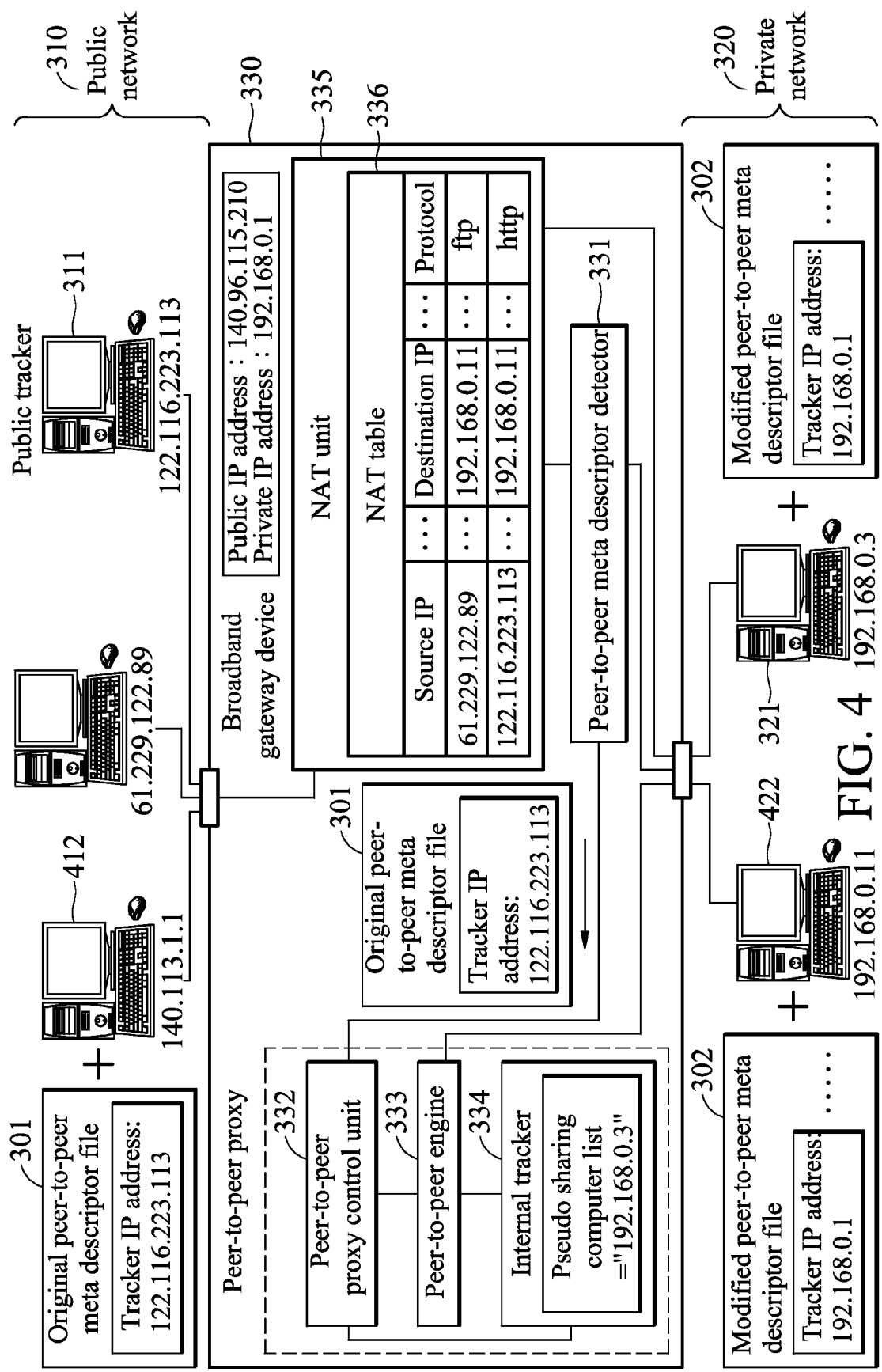
FIG. 4 is a block diagram illustrating a peer-to-peer proxy service provided in a network gateway device according to another embodiment of the invention.

FIG. 4 is a block diagram illustrating a peer-to-peer proxy service provided in a network gateway device according to another embodiment of the invention. In this embodiment, the computer 321 has finished downloading the shared contents by the method depicted in FIG. 3 and is sharing the shared contents. That means the network address (192.168.0.3) and port number (not shown in FIG. 4) of the computer 321 is in the pseudo sharing computer list.

As shown in FIG. 4, the computer 422 in the private network 320 tries to download a peer-to-peer meta descriptor file from the public network 310 and the peer-to-peer meta descriptor file happens to be the same peer-to-peer meta descriptor file as the peer-to-peer meta descriptor file 301 (or the peer-to-peer meta descriptor file may be a different peer-to-peer meta descriptor file with the same shared contents indicated within) from the public network 310. The peer-to-peer meta descriptor detector 331 intercepts the original peer-to-peer meta descriptor file 301 and forwards it to the peer-to-peer proxy control unit 332. When the peer-to-peer proxy control unit 332 receives the original peer-to-peer meta descriptor file 301, it forwards the original peer-to-peer meta descriptor file 301 to the peer-to-peer engine 333 and modifies the original peer-to-peer meta descriptor file 301 by replacing the network address and port number of the tracker with the private network address of the internal tracker 334 of the network gateway device 330 (for example, 192.168.0.1: 9786) to generate the modified peer-to-peer meta descriptor file 302. The peer-to-peer proxy control unit 332 further forwards the modified peer-to-peer meta descriptor file 302 to the computer 422 and the peer-to-peer engine 333.

In the meantime, the peer-to-peer engine 333 loads the modified peer-to-peer meta descriptor file 302 and inquiries with the internal tracker 334 to see if any computer is sharing the shared contents. As there is already a computer (computer 321) in the private network 320 sharing the shared contents, the pseudo sharing computer list in the internal tracker 334 is not empty, and computer 321 is included. When the peer-to-peer engine 333 gets the non-empty pseudo sharing computer list from the internal tracker 334, it realizes that there's a computer sharing the shared contents, so it doesn't inform the internal tracker 334 that it is sharing the shared contents.

When the computer 422 receives the modified peer-to-peer meta descriptor file 302 from the network gateway device 330, it sends, according to the network address of the tracker indicated in the modified peer-to-peer meta descriptor file 302, a second inquiry message to the internal tracker 334 to ask for a list of computers that are sharing the shared contents at that moment. The internal tracker 334 replies to the computer 422 with the pseudo sharing computer list. Since the network address and port number of the computer 321 appear in the pseudo sharing computer list, the computer 422 realizes that computer 321 is sharing the shared contents and starts downloading the shared contents from computer 321.

To further illustrate, the internal tracker 334 will actively or passively update the pseudo sharing computer list. When the peer-to-peer engine 333 realizes from the internal tracker 334 that there are other computers sharing the shared contents in the private network 320, it will inform the internal tracker 334 that it has stopped sharing the shared contents, so that the internal tracker 334 will delete the information of the peer-to-peer engine 333 from the pseudo sharing computer list. On the other hand, when the peer-to-peer engine 333 realizes from the internal tracker 334 that no computer is sharing the shared contents in the private network 320, it will inform the internal tracker 334 that it is sharing the shared contents, so that the internal tracker 334 will add the network address (192.168.0.1) and port number (not shown in FIG. 4) of peer-to-peer engine 333 to the pseudo sharing computer list.

When the computer 321 stops sharing the shared contents, download failure will occur in the computer 422. The computer 422 then sends a third inquiry message to the internal tracker 334 to get a new pseudo sharing computer list. Supposedly, the new pseudo sharing computer list has been updated with the computer 321 deleted and peer-to-peer engine 333 added. With the new pseudo sharing computer list, the computer 422 sends a second request message to the peer-to-peer engine 333 requesting to download the shared contents. After that, the peer-to-peer engine 333 starts to download the shared contents and forwards the shared contents to computer 422.

The peer-to-peer proxy service of the invention can also be used to handle the peer-to-peer request from the public network 310. As shown in FIG. 4, the computer 412 from the public network 310 knows from the public tracker 311 that the peer-to-peer engine 333 of the network gateway device 330 is sharing the shared contents, since every downloading node is also an uploading node. The computer 412 then sends a third request message to the peer-to-peer engine 333, and requests to download the shared contents. When the peer-to-peer engine 333 receives the request message, it inquires with the internal tracker 334 to see if any computer is sharing the shared contents in the private network 320, and receives the pseudo sharing computer list from the internal tracker 334. If the pseudo sharing computer list is not empty, the peer-to-peer engine 333 will start to download the shared contents according to the pseudo sharing computer list and forward the shared contents to the computer 421.

The NAT unit 335 performs the NAT procedure on every packet datagram passing through network gateway device 330, except for the external inquiry message and the shared contents. That is to say, the packet datagram of the peer-to-peer communication doesn't need to be handled by the NAT unit 335 and thus burden on system resources spent during the NAT procedure is decreased.

Figure 5:
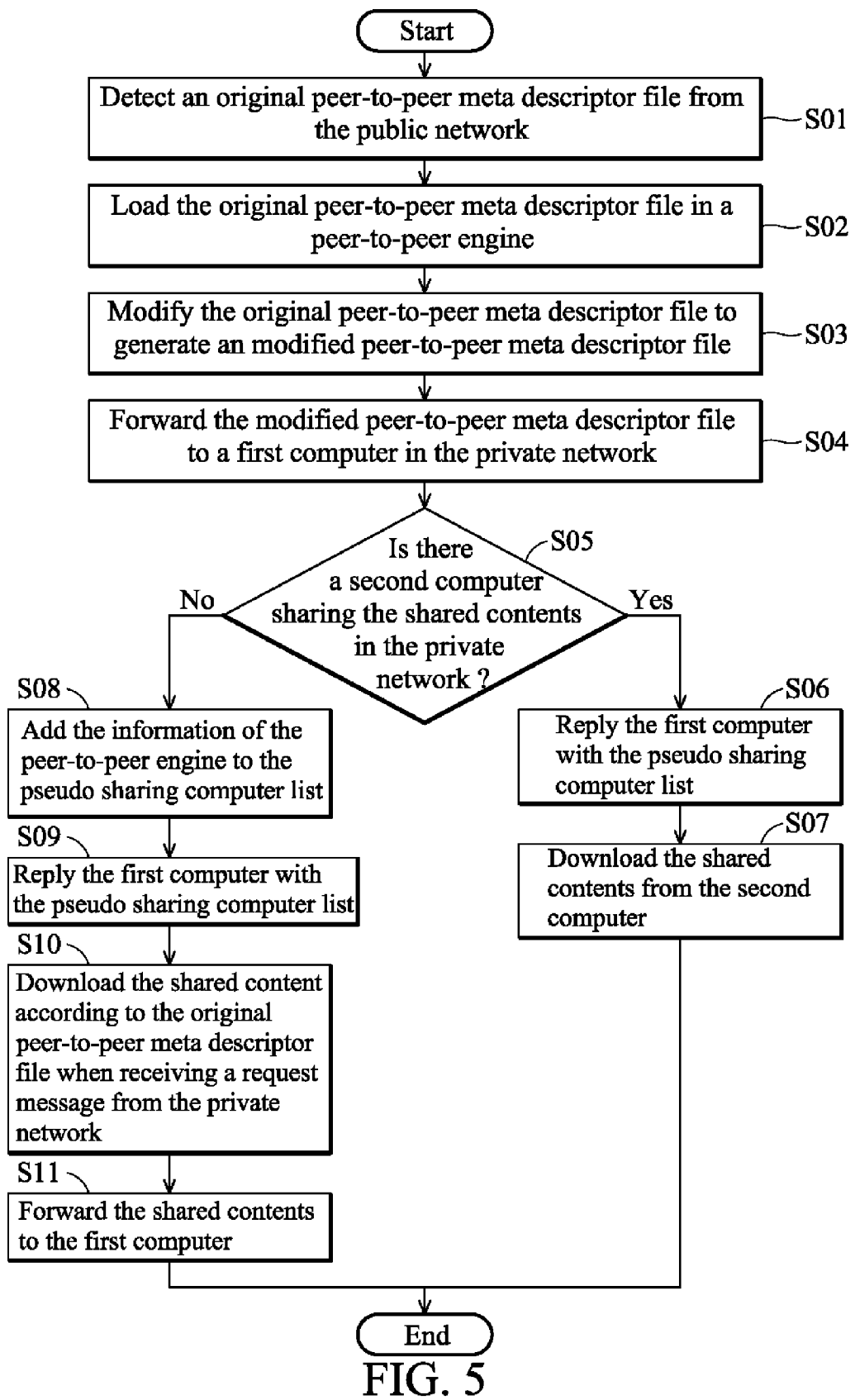
FIG. 5 is a flow chart illustrating a peer-to-peer communication method for providing peer-to-peer proxy services in a network gateway device according to the embodiments of the invention.

FIG. 5 is a flow chart illustrating a peer-to-peer communication method for providing peer-to-peer proxy services in a network gateway device according to the embodiments of the invention. The method starts with the network gateway device detecting an original peer-to-peer meta descriptor file from the public network (step S01) and loading the original peer-to-peer meta descriptor file in a peer-to-peer engine (step S02). The network gateway device then modifies the original peer-to-peer meta descriptor file by replacing the network address of the tracker with the private network address of the network gateway device, generates a modified peer-to-peer meta descriptor file (step S03), and forwards the modified peer-to-peer meta descriptor file to a first computer in the private network (step S04).

After that, the peer-to-peer engine inquires with an internal tracker in the network gateway device and receives a pseudo sharing computer list. The peer-to-peer engine determines whether there is a second computer sharing the shared contents in the private network according to the pseudo sharing computer list (step S05). If there is a second computer sharing the shared contents in the private network (step S05—YES), the network gateway device replies to the first computer with a pseudo sharing computer list indicating that the second computer is sharing the shared contents (step S06) so that the first computer can download the shared contents from the second computer (step S07), thus completing the steps. Otherwise, if there is no computer sharing the shared contents in the private network (step S05—NO), the network gateway device adds the information of the peer-to-peer engine to the pseudo sharing computer list (step S08) and replies to the first computer with the pseudo sharing computer list (step S09). The network gateway device next downloads the shared content according to the original peer-to-peer meta descriptor file when receiving a request message from the private network for downloading the shared contents (step S10) and further forwards the shared contents to the first computer (step S11). When all the shared contents are downloaded and forwarded to the first computer, the method ends.

The peer-to-peer communication method as shown in FIG. 5 can also handle the request from the public network. Since every downloading node in the peer-to-peer communication is also an uploading node, a computer from the public network may know from a public tracker that the peer-to-peer engine in the network gateway device is sharing the shared contents. The computer in the public network may send a request message to the peer-to-peer engine requesting to download the shared contents. The peer-to-peer engine then downloads the shared contents from the private network according to the pseudo sharing computer list and forwards the shared contents to the computer in the public network.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A network gateway device connected between a private network and a public network, comprising:
   a peer-to-peer meta descriptor detector detecting an original peer-to-peer meta descriptor file from the public network;
   a peer-to-peer proxy control unit receiving the original peer-to-peer meta descriptor file from the peer-to-peer meta descriptor detector, modifying the original peer-to-peer meta descriptor file by replacing a network address of a tracker with a private network address in the private network to generate a modified peer-to-peer meta descriptor file, and forwarding the modified peer-to-peer meta descriptor file to a first computer in the private network;
   an internal tracker, associated with the private network address, receiving a first inquiry message from the first computer and replying to the first computer with a pseudo sharing computer list; and
   a peer-to-peer engine loading the original peer-to-peer meta descriptor file, receiving a first request message from the first computer for downloading shared contents, downloading the shared contents according to the original peer-to-peer meta descriptor file, and forwarding the shared contents to the first computer;
   wherein the internal tracker further adds the information of the first computer to the pseudo sharing computer list when detecting that the first computer has finished downloading the shared contents; and
   wherein the internal tracker further deletes the information of the first computer from the pseudo sharing computer list and adds the information of the peer-to-peer engine to the pseudo sharing computer list when detecting that the first computer has stopped sharing the shared contents.

2. The network gateway device of claim 1, wherein the pseudo sharing computer list stores the information of the computers in the private network which are sharing the shared contents.

3. The network gateway device of claim 1, wherein the peer-to-peer engine further informs the internal tracker, when the pseudo sharing computer list is empty, that it is sharing the shared contents so that the internal tracker further adds the information of the peer-to-peer engine to the pseudo sharing computer list.

4. The network gateway device of claim 1, wherein the peer-to-peer proxy control unit further forwards the modified peer-to-peer meta descriptor file to a second computer in the private network.

5. The network gateway device of claim 4, wherein the internal tracker further receives a second inquiry message from the second computer and replies to the second computer with the pseudo sharing computer list so that the second computer downloads the shared contents from the first computer.

6. The network gateway device of claim 4, wherein the internal tracker replies to the second computer with the pseudo sharing computer list when receiving a third inquiry message from the second computer.

7. The network gateway device of claim 6, wherein the peer-to-peer engine further receives a second request message from the second computer for downloading the shared contents, downloads the shared contents according to the original peer-to-peer meta descriptor file, and forwards the shared contents to the second computer.

8. The network gateway device of claim 1, wherein the peer-to-peer engine further receives a third request message from a third computer in the public network for downloading the shared contents, downloads the shared contents from the first computer according to the pseudo sharing computer list received from the internal tracker, and forwards the shared contents to the third computer.

9. A network gateway device connected between a private network and a public network, comprising:
   a peer-to-peer meta descriptor detector detecting an original peer-to-peer meta descriptor file from the public network;
   a peer-to-peer proxy control unit receiving the original peer-to-peer meta descriptor file from the peer-to-peer meta descriptor detector, modifying the original peer-to-peer meta descriptor file by replacing a network address of a tracker with a private network address in the private network to generate a modified peer-to-peer meta descriptor file, and forwarding the modified peer-to-peer meta descriptor file to a first computer in the private network;
   an internal tracker, associated with the private network address, receiving a first inquiry message from the first computer, determining whether a second computer in the private network is sharing shared contents inquired by the first computer, and replying to the first computer with a pseudo sharing computer list so that the first computer downloads shared contents from the second computer; and
   a peer-to-peer engine loading the original peer-to-peer meta descriptor file;
   wherein the internal tracker further adds the information of the first computer to the pseudo sharing computer list when detecting that the first computer has finished downloading the shared contents; and
   wherein the internal tracker further deletes the information of the first computer from the pseudo sharing computer list and adds the information of the peer-to-peer engine to the pseudo sharing computer list when detecting that the first computer has stopped sharing the shared contents.

10. The network gateway device of claim 9, wherein the pseudo sharing computer list stores information indicating that the second computer is sharing the shared contents.

11. The network gateway device of claim 9, wherein the internal tracker further deletes the information of the second computer from the pseudo sharing computer list and adds the information of the peer-to-peer engine to the pseudo sharing computer list when detecting that the second computer has stopped sharing the shared contents, and replies to the first computer with the pseudo sharing computer list when receiving a second inquiry message from the first computer.

12. The network gateway device of claim 11, wherein the peer-to-peer engine further receives a first request message from the first computer for downloading the shared contents, downloads the shared contents according to the original peer-to-peer meta descriptor file, and forwards the shared contents to the first computer.

13. The network gateway device of claim 9, wherein the peer-to-peer engine further receives a second request message from a third computer in the public network for downloading the shared contents, downloads the shared contents according to the pseudo sharing computer list received from the internal tracker, and forwards the shared contents to the third computer.

14. A peer-to-peer communication method for providing peer-to-peer proxy service in a network gateway device connected between a private network and a public network, comprising:
    detecting an original peer-to-peer meta descriptor file from the public network;
    loading the original peer-to-peer meta descriptor file in a peer-to-peer engine within the network gateway device;
    modifying the original peer-to-peer meta descriptor file by replacing a network address of a tracker with a private network address in the private network to generate a modified peer-to-peer meta descriptor file;
    forwarding the modified peer-to-peer meta descriptor file to a first computer in the private network;
    receiving a first inquiry message from the first computer;
    generating a pseudo sharing computer list storing information indicating that the peer-to-peer engine is sharing shared contents;
    replying to the first computer with the pseudo sharing computer list;
    receiving, by the peer-to-peer engine, a first request message from the first computer for downloading the shared contents;
    downloading, by the peer-to-peer engine, the shared contents according to the original peer-to-peer meta descriptor file in response to the first request message;
    forwarding, by the peer-to-peer engine, the downloaded shared contents to the first computer;
    adding the information of the first computer to the pseudo sharing computer list when detecting that the first computer has finished downloading the shared contents; and
    deleting the information of the first computer from the pseudo sharing computer list and adding the information of the peer-to-peer engine to the pseudo sharing computer list when detecting that the first computer has stopped sharing the shared contents.

15. The peer-to-peer communication method of claim 14, wherein further comprising determining whether a second computer in the private network is sharing the shared contents, deleting the information of the peer-to-peer engine from the pseudo sharing computer list and adding the information of the second computer to the pseudo sharing computer list, if the second computer is sharing the shared contents.

16. The peer-to-peer communication method of claim 15, further comprising forwarding the modified peer-to-peer meta descriptor file to a third computer in the private network.

17. The peer-to-peer communication method of claim 16, further comprising receiving a second inquiry message from the third computer and replying to the third computer with the pseudo sharing computer list, so that the third computer downloads the shared contents from the second computer.

18. The peer-to-peer communication method of claim 14, further comprising adding the information of the first computer to the pseudo sharing computer list when detecting that the first computer has finished downloading the shared contents.

19. The peer-to-peer communication method of claim 18, further comprising receiving, by the peer-to-peer engine, a second request message from a third computer in the public network for downloading the shared contents, downloading, by the peer-to-peer engine, the shared contents from the first computer according to the pseudo sharing computer list, and forwarding, by the peer-to-peer engine, the shared contents to the third computer.

* * * * *